(12) United States Patent
Bussmann et al.

(10) Patent No.: US 10,023,168 B2
(45) Date of Patent: Jul. 17, 2018

(54) HYDRAULIC POWER UNIT AND BRAKING SYSTEM FOR A VEHICLE

(71) Applicant: Robert Bosch GmbH, Stuttgart (DE)

(72) Inventors: Otmar Bussmann, Abstatt (DE); Matthias Kistner, Bretzfeld (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/151,053

(22) Filed: May 10, 2016

(65) Prior Publication Data

US 2016/0332611 A1  Nov. 17, 2016

(30) Foreign Application Priority Data

May 13, 2015  (DE) ........................ 10 2015 208 876

(51) Int. Cl.
| | |
|---|---|
| *B60T 15/02* | (2006.01) |
| *B60T 13/14* | (2006.01) |
| *B60T 11/224* | (2006.01) |
| *B60T 13/66* | (2006.01) |
| *B60T 13/68* | (2006.01) |

(52) U.S. Cl.
CPC ........... *B60T 15/028* (2013.01); *B60T 11/224* (2013.01); *B60T 13/146* (2013.01); *B60T 13/662* (2013.01); *B60T 13/686* (2013.01)

(58) Field of Classification Search
CPC .... B60T 11/224; B60T 13/142; B60T 13/146; B60T 13/662; B60T 13/686; B60T 15/028; B60T 13/161; B60T 8/4275; B60T 8/441

USPC .......................................................... 303/10
See application file for complete search history.

(56) References Cited

U.S. PATENT DOCUMENTS

| | | | | |
|---|---|---|---|---|
| 4,869,561 | A * | 9/1989 | Gatt ........................ | B60T 8/347 303/116.1 |
| 5,967,628 | A * | 10/1999 | Abe ......................... | B60T 7/12 188/353 |
| 2001/0005100 | A1* | 6/2001 | Kamiya .................... | B60T 7/12 303/5 |
| 2002/0059796 | A1* | 5/2002 | Dieringer ............... | B60T 8/4275 60/565 |
| 2010/0237689 | A1* | 9/2010 | Nakazawa .............. | B60T 8/368 303/10 |

(Continued)

FOREIGN PATENT DOCUMENTS

| | | | | |
|---|---|---|---|---|
| DE | 102013200471 A1 | 7/2014 | | |
| DE | 102013223207 A1 * | 5/2015 | ............. | B60T 7/042 |
| DE | 102013223207 A1 * | 5/2015 | ............. | B60T 7/042 |

*Primary Examiner* — Robert Siconolfi
*Assistant Examiner* — San A Aung
(74) *Attorney, Agent, or Firm* — Norton Rose Fulbright US LLP; Gerard Messina (57) ABSTRACT

A hydraulic power unit for a braking system of a vehicle, including a first sub-brake circuit or brake circuit and a second sub-brake circuit or brake circuit, a first supply line branching into a first line section having a first circuit separating valve situated therein, and a second line section having a first electrically controllable reservoir separating valve and/or first check valve situated therein, and a second supply line branching into a third line section having a second circuit separating valve situated therein and a fourth line section having a second electrically controllable reservoir separating valve and/or second check valve situated therein.

9 Claims, 6 Drawing Sheets

(56) References Cited

U.S. PATENT DOCUMENTS

| | | | |
|---|---|---|---|
| 2014/0152084 A1* | 6/2014 | Kawase | F04C 2/10 303/10 |
| 2016/0016572 A1* | 1/2016 | Higashi | B60T 8/4872 303/10 |
| 2016/0075318 A1* | 3/2016 | Ahn | B60T 8/4881 303/10 |

* cited by examiner

HYDRAULIC POWER UNIT AND BRAKING SYSTEM FOR A VEHICLE

CROSS REFERENCE

The present application claims the benefit under 35 U.S.C. § 119 of German Patent Application No. DE 10 2015 208 876.6 filed on May 13, 2015, which is expressly incorporated herein by reference in its entirety.

FIELD

The present invention relates to a hydraulic power unit for a braking system of a vehicle. The present invention further relates to a braking system for a vehicle.

BACKGROUND INFORMATION

A power unit for a hydraulic braking system is described in German Patent Application No. DE 10 2013 200 471 A1. A braking system equipped with the power unit of German Patent Application No. DE 10 2013 200 471 A1 has two brake circuits, each of which is connected via a switching valve to a master brake cylinder and moreover is connected via a pressure relief valve to a brake fluid reservoir. By activating the particular pressure relief valve in such a way that the particular pressure relief valve is at least intermittently present in an at least partially opened state during an actuation of a brake actuating element which is connected to the master brake cylinder, brake fluid is to be displaceable from the associated brake circuit into the brake fluid reservoir to prevent or limit in this way a brake pressure buildup in at least one wheel brake cylinder of the associated brake circuit.

SUMMARY

The present invention creates a hydraulic power unit for a braking system of a vehicle, and a braking system for a vehicle.

An example embodiment of the present invention implements a hydraulic system which at least allows volume/brake fluid to be drained from the master brake cylinder/the first brake circuit into the first storage chamber and/or allows volume/brake fluid to be drained from the master brake cylinder/the second brake circuit into the second storage chamber. An actuation of a brake actuating element connected to the master brake cylinder is thus not automatically associated with a displacement of the volume, which in this way is pressed out of the master brake cylinder, into the at least one first wheel brake cylinder and into the at least one second wheel brake cylinder. Instead, it is possible to minimize/prevent a brake pressure buildup in the at least one first wheel brake cylinder and/or in the at least one second wheel brake cylinder, if so desired, with the aid of a volume intermediate storage in the first storage chamber and/or in the second storage chamber. A thus preventable/limitable brake action of the at least one first wheel brake cylinder and/or of the at least one second wheel brake cylinder may be used, for example, for blending at least one generator braking torque. The present invention increases and thus improves the options for recuperatively braking a vehicle.

As a result of the option implemented according to the present invention for draining volume/brake fluid, it is additionally possible to limit the at least one internal pressure present in the master brake cylinder during the actuation of the brake actuating element to a predefinable setpoint system pressure. The present invention may thus also be used to create a pleasant brake actuation sensation (pedal sensation) for a driver applying a pressure to the master brake cylinder via the brake actuating element. The present invention thus also increases the acceptance of braking systems designed for recuperative braking.

It is furthermore pointed out that the present invention implements braking systems which, due to the use of the first storage chamber advantageously connected to the first supply line and/or the second storage chamber advantageously connected to the second supply line for intermediate storage of volume/brake fluid, require no suction lines to a brake fluid reservoir. The braking system implemented according to the present invention is therefore easier and more cost-effective to produce compared to a standard braking device including suction lines to the reservoir. In particular, the present invention also improves a separability/subdividability of a braking system into a master brake cylinder and into a hydraulic power unit/power unit/a hydraulic system. The present invention furthermore thus implements a closed braking system, which has a higher safety standard compared to an open braking system.

In one advantageous specific embodiment of the hydraulic power unit/braking system, the first sub-brake circuit or brake circuit includes a first connecting line section having a first pump situated therein, which at its first end between the first circuit separating valve and the at least one first connecting section/wheel brake cylinder is connected to the first line section, and at its second end between the first reservoir separating valve or first check valve and the first storage chamber is connected to the second line section. As an alternative or in addition, the second sub-brake circuit or brake circuit may also include a second connecting line section having a second pump situated therein, which at its first end between the second circuit separating valve and the at least one second connecting section/wheel brake cylinder is connected to the third line section, and at its second end between the second reservoir separating valve or second check valve and the second storage chamber is connected to the fourth line section. With the aid of an operation of the first pump, it is thus possible to implement a brake pressure buildup/a brake boost in the at least one first wheel brake cylinder. If necessary, it is also possible to carry out a brake pressure buildup/a brake boost in the at least one second wheel brake cylinder with the aid of the second pump. In this specific embodiment, the present invention thus also creates options for carrying out an autonomous braking process or a brake boost, by dispensing with an additional brake booster or a further pressure build-up device.

Use of the present invention may thus render it unnecessary to equip a braking system with a brake booster, such as an electromechanical or a vacuum brake booster, or with a motorized piston-cylinder device.

For example, the first pump may be an internal gear pump. The second pump may also be an internal gear pump. In this way, a cost-effective and easily installable pump type (including only one pump unit) may be used to implement the present invention.

In a further advantageous specific embodiment of the hydraulic power unit/braking system, the first sub-brake circuit or brake circuit includes a third supply line, which is connected or connectable to the particular master brake cylinder. In particular, the third supply line may open into the first line section. As is described in greater detail hereafter, in this case the third supply line may contribute to the boost of a brake pressure buildup, in particular in a fallback level.

In one advantageous refinement of the braking system, the first supply line is connected to a ring volume of the master brake cylinder, the second supply line is connected to a floating piston chamber of the master brake cylinder, and the third supply line is connected to a rod piston chamber of the master brake cylinder. Such a connection implements a faster brake pressure buildup in the fallback level, which is frequently also referred to as a fast fill effect.

BRIEF DESCRIPTION OF THE DRAWINGS

Further features and advantages of the present invention are described below based on the figures.

DETAILED DESCRIPTION OF EXAMPLE EMBODIMENTS

Figure 1:
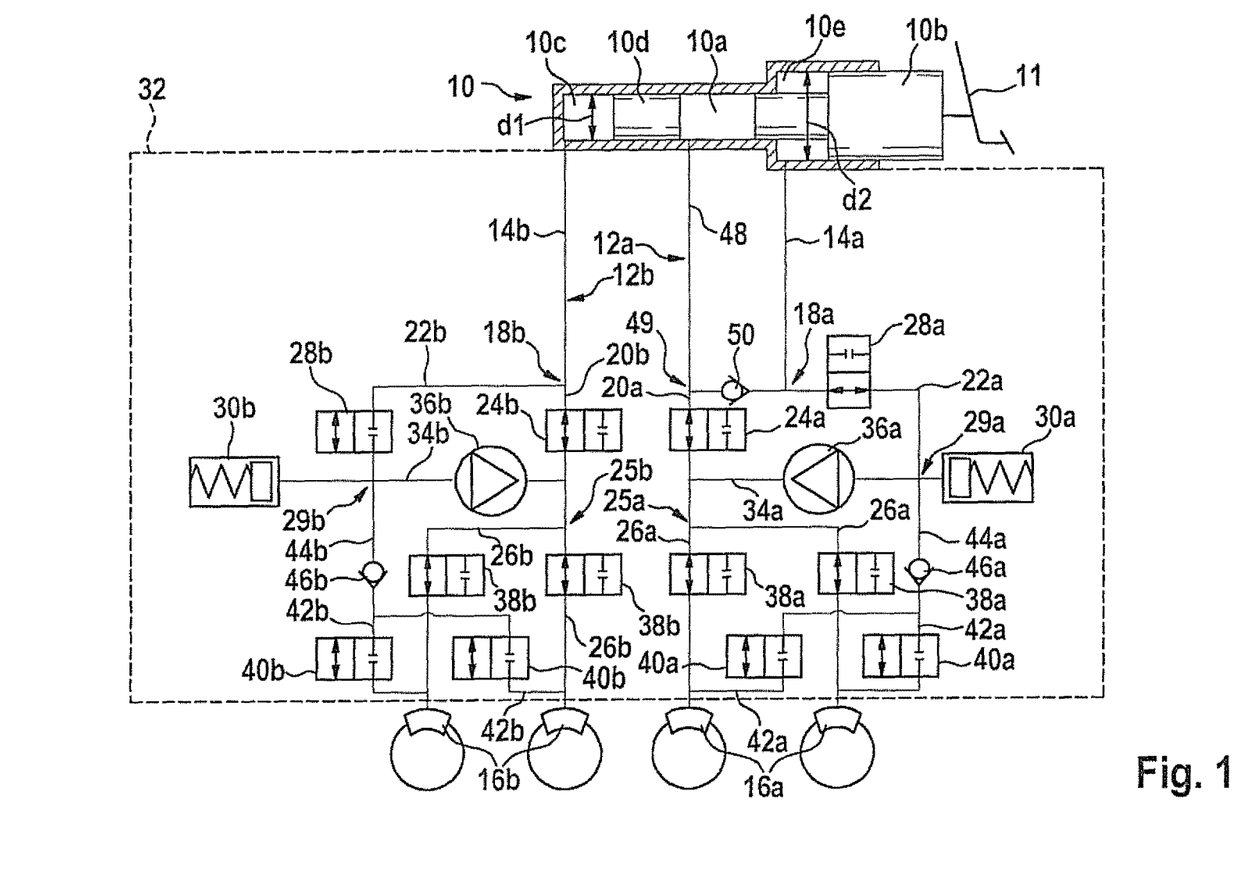
FIG. 1 shows a schematic representation of a first specific embodiment of a braking system for a vehicle.

FIG. 1 shows a schematic representation of a first specific embodiment of a braking system for a vehicle.

The braking system of FIG. 1 includes a master brake cylinder 10 (having a connected brake actuating element/brake pedal 11), a first brake circuit 12a, and a second brake circuit 12b. First brake circuit 12a includes a first supply line 14a connected to master brake cylinder 10, and at least one first wheel brake cylinder 16a. Correspondingly, second brake circuit 12b also includes a second supply line 14b connected to master brake cylinder 10, and at least one second wheel brake cylinder 16b. It is pointed out that equipping, as shown in FIG. 1, first brake circuit 12a with exactly two first wheel brake cylinders 16a, and second brake circuit 12b with also two second wheel brake cylinders 16b, shall be interpreted only by way of example. Moreover, the braking system equipped with two brake circuits 12a and 12b may be designed both for an X-type brake circuit split and for a parallel brake circuit split.

First supply line 14a splits (at a supply line end 18a directed away from master brake cylinder 10) into a first line section 20a and a second line section 22a. A first (electrically controllable) circuit separating valve 24a is situated in first line section 20a. Moreover, the at least one first wheel brake cylinder 16a is connected directly or indirectly (e.g., via at least one first connecting section 26a) to first line section 20a. In the specific embodiment of FIG. 1, first line section 20a only by way of example includes an end section 25a which is directed away from first supply line 14a and which branches into two first connecting sections 26a, each of the two first connecting sections 26a leading to one of the first wheel brake cylinders 16a. A first electrically controllable reservoir separating valve 28a is situated in second line section 22a. Furthermore, a first storage chamber 30a is connected to second line section 22a, e.g., to an end section or branching point 29a of second line section 22a which is directed away from first supply line 14a.

Correspondingly, second supply line 14b also branches (at a supply line end 18b directed away from master brake cylinder 10) into a third line section 20b having a second (electrically controllable) circuit separating valve 24b situated therein, and a fourth line section 22b having a second reservoir separating valve 28b situated therein. The at least one second wheel brake cylinder 16b is connected directly or indirectly (e.g., via at least one second connecting section 26b) to third line section 20b. For example, an end section 25b, which is directed away from second supply line 14b, of third line section 20b may branch into two second connecting sections 26b, each of the two second connecting sections 26b leading to one of the second wheel brake cylinders 16b. Moreover, a second storage chamber 30b is connected to fourth line section 22b, e.g., to an end section or branching point 29b of fourth line section 22b which is directed away from second supply line 14b.

A brake fluid which is pressed out of master brake cylinder 10 may thus be intermediately stored in first storage chamber 30a and/or in second storage chamber 30b. The braking system of FIG. 1 thus creates options for intermediate storage of volume/brake fluid without using a suction line or a brake fluid reservoir. This allows the braking system of FIG. 1 to be divided into master brake cylinder 10 and a hydraulic power unit 32, in which in a simple manner at least one sub-brake circuit of first brake circuit 12a including components 14a and 18a through 30a, and at least one sub-brake circuit of second brake circuit 12b including components 14b and 18b through 30b, may be formed. This division of braking system into master brake cylinder 10 and hydraulic power unit 32 is achieved without increasing a number of its valves or its other components. In one advantageous specific embodiment, no external lines extending between master brake cylinder 10/a hydraulic reservoir and hydraulic power unit 32 are needed either. The braking system of FIG. 1 is a closed braking system and thus has a high safety standard. Additionally, the braking system is comparatively easy to manufacture and installable with relatively little effort.

First storage chamber 30a is preferably a low-pressure storage chamber. Correspondingly, second storage chamber 30b may also be a low-pressure storage chamber.

In the specific embodiment of FIG. 1, first brake circuit 12a also includes a first connecting line section 34a. At its first end, first connecting line section 34a is connected to first line section 20a, e.g., at a subsection of the first line section which extends from first circuit separating valve 24a up to end section 25a. At its second end, first connecting line section 34a is connected to second line section 22a, preferably at a subsection of second line section 22a which extends between first reservoir separating valve 28a and end section or branching point 29a/first storage chamber 30a. The second end of the first connecting section may in particular be connected to the end section or branching point 29a. Moreover, a first pump 36a is situated in first connecting line section 34a. First pump 36a is preferably oriented in such a way that brake fluid is pumpable with the aid of first pump 36a from second line section 22a and/or first storage chamber 30a in the direction of end section 25a of first line section 20a. As is described in greater detail hereafter, an autonomous brake pressure buildup may be carried out in the at least one first wheel brake cylinder 16a of first brake circuit 12a with the aid of first pump 36a. It is furthermore pointed out that a brake pressure buildup may also be carried out in the at least one first wheel brake cylinder 16a of first brake circuit 12a with the aid of first pump 36a.

The braking system equipped at least with first pump 36a may be used as a power braking system. (A power braking system may be understood to mean a braking system which is designed to carry out an autonomous brake pressure buildup in at least one wheel brake cylinder 16a and 16b even without a driver braking force being provided.) With the exception of first pump 36a, the braking system advantageously requires no further brake pressure buildup component for carrying out a desired autonomous brake pressure buildup in the at least one first wheel brake cylinder 16a of first brake circuit 12a. Moreover, the braking system equipped at least with first pump 36a is designed as a servo braking system, to assist a driver with respect to force in the deceleration of his or her vehicle equipped with the braking system, only the use of first pump 36a being required for a brake boost in the at least one first wheel brake cylinder 16a of first brake circuit 12a. A brake booster which is conventionally required for this purpose, such as a vacuum brake booster or an electromechanical brake booster, may be dispensed with, without having to tolerate losses in the brake boost in the at least one first wheel brake cylinder 16a of first brake circuit 12a. The braking system designed as a servo braking system thus implements a brake boost, while simultaneously saving the costs of the brake booster which is conventionally still required for this purpose. Moreover, the braking system of FIG. 1 creates a brake boost, without having to solve the problem of the frequently complex connection of a conventional brake booster type to the braking system.

Optionally, second brake circuit 12b also includes at least one second connecting line section 34b having a second pump 36b situated therein. At its second end, second connecting line section 34b is connected to third line section 20b, e.g., at a subsection of third line section 20b which extends between second circuit separating valve 24b and end section 25a. At its second end, second connecting line section 34b is connected to fourth line section 22b, preferably at a subsection of fourth line section 22b which extends from second electrically controllable reservoir separating valve 28b up to an end section or branching point 29b/second storage chamber 30b. In the specific embodiment of FIG. 1, second pump 36b is also oriented in such a way that brake fluid is pumpable with the aid of second pump 36b from fourth line section 22b and/or second storage chamber 30b in the direction of end section 25b of third line section 20b. In this way, it is also possible to use second pump 36b for carrying out an autonomous brake pressure buildup in the at least one second wheel brake cylinder 16b of second brake circuit 12b. Moreover, it is possible to use second pump 36b also for building up the brake pressure for the at least one second wheel brake cylinder 16b of second brake circuit 12b.

The braking system of FIG. 1 equipped with first pump 36a and second pump 36b thus provides all functions of a power braking system and of a servo braking system.

First pump 36a may be a gear pump, for example, in particular an internal gear pump. Correspondingly, second pump 36b may also be a gear pump, in particular an internal gear pump. However, it is pointed out that neither first pump 36a nor second pump 36b is limited to a certain pump type.

In the specific embodiment of FIG. 1, a wheel inlet valve 38a or 38b and a wheel outlet valve 40a or 40b respectively are assigned to each wheel brake cylinder 16a and 16b. By way of example, one of wheel inlet valves 38a or 38b is inserted into each of connecting sections 26a or 26b. Each of wheel outlet valves 40a and 40b is inserted into an intermediate line section 42a or 42b, which is connected to associated wheel brake cylinder 16a or 16b. The two intermediate line sections 42a or 42b of the same brake circuit 12a or 12b open into a further intermediate line section 44a or 44b, which ends at storage chamber 30a or 30b of the same brake circuit 12a or 12b, or end section or branching point 29a or 29b. Storage chambers 30a and 30b may thus also be used for intermediate storage of brake fluid which is transferred out of at least one wheel brake cylinder 16a and 16b. Moreover, preferably one check valve 46a or 46b each is inserted into further intermediate line sections 44a or 44b in such a way that a brake fluid displacement out of storage chamber 30a or 30b via intermediate line sections 42a or 42b to associated wheel brake cylinders 16a or 16b is suppressed.

For master brake cylinder 10, any master brake cylinder type is suitable which includes at least one rod piston chamber 10a (rod piston pressure chamber), an adjustable rod piston 10b delimiting rod piston chamber 10a, a floating piston chamber 10c (floating piston pressure chamber), and a floating piston 10d adjustably situated between rod piston chamber 10a and floating piston chamber 10c. Merely as an advantageous refinement, master brake cylinder 10 of FIG. 1 includes a stepped borehole and a rod piston 10b designed as a stepped piston. Rod piston 10b is situated in the stepped borehole in such a way that a tapered section of rod piston 10b projects into an internal section of the stepped borehole having a first diameter d1, while a widened section of stepped piston 10b is situated within an outer section of the stepped borehole having a second diameter d2 greater than first diameter d1. Rod piston chamber 10a and floating piston chamber 10c are formed in the internal section of the stepped borehole. Rod piston 10b with its tapered section thus delimits rod piston chamber 10a, and with its widened section delimits a ring volume 10e of master brake cylinder 10.

First supply line 14a is connected to ring volume 10e, while second supply line 14b is connected to floating piston chamber 10c. The braking system of FIG. 1 furthermore includes a third supply line 48 of first brake circuit 12a as an advantageous refinement, which is connected to master brake cylinder 10, in particular to rod piston chamber 10a. Third supply line 48 opens into first line section 20a. Via third supply line 48, an additional brake fluid volume is displaceable to the at least one first wheel brake cylinder 16a of first brake circuit 12a, in particular in a fallback level of the braking system of FIG. 1. In this way, the vehicle equipped with the braking system may be brought to a halt more quickly, specifically in an emergency braking situation.

Preferably, an opening section 49 of third supply line 48 is situated in a subsection of first line section 20a which extends between supply line end 18a and first circuit separating valve 24a. Additionally, a check valve 50 is situated in first line section 20a between supply line end 18a and opening section 49. Check valve 50 is preferably oriented in such a way that a brake fluid flow proceeding from third supply line 48 in the direction of first supply line 14a or second line section 22a is suppressed by first line section 20a.

The advantages of this connection of the two brake circuits 12a and 12b to master brake cylinder 10 via the three supply lines 14a, 14b and 48 are described in greater detail hereafter:

During an actuation of a brake actuating element connected to master brake cylinder 10 by the driver, first circuit separating valve 24a and second circuit separating valve 24b are closed, provided the braking system is present in a functional state and its sufficient power supply is ensured. To enable a pleasant brake actuation sensation (pedal sensation) for the driver actuating the brake actuating element, a first brake fluid volume may be displaced out of the ring chamber via first reservoir separating valve 28a, which is controlled to be open, into first storage chamber 30a and/or a second brake fluid volume may be displaced out of the floating piston chamber via second circuit separating valve 28b, which is controlled to be open, into second storage chamber 30b. At the same time, a brake pressure buildup may be effectuated with the aid of first pump 36a in the at least one first wheel brake cylinder 16a and/or a brake pressure buildup may be effectuated with the aid of second pump 36b in the at least one second wheel brake cylinder 16b. If an additional volume is needed for the brake pressure buildup in first brake circuit 12a, this may be suctioned out of the ring chamber (via first reservoir separating valve 28a, which is at least intermittently controlled to be open). Correspondingly, a potentially needed additional volume for the brake pressure buildup in second brake circuit 12b may also be suctioned out of the floating piston chamber (via second reservoir separating valve 28b, which is at least intermittently controlled to be open). For a brake pressure reduction, the additional volume may be hidden in first storage chamber 30a. The additional volume of second brake circuit 12b may be reduced via the floating piston chamber.

During the partially active state, a wheel-individual pressure modulation with the aid of the ESP system is also possible.

For partial braking, a volume is withdrawn from the ring chamber for the pressure buildup in first brake circuit 12a. Thereafter, first reservoir separating valve 28a is closed. A driver force simulation is carried out with the aid of the floating circuit.

An autonomous brake pressure buildup may also be carried out in the braking system of FIG. 1. For this purpose, the required volume is suctioned out of ring chamber 10e with the aid of first pump 36a. Correspondingly, a required volume may be suctioned out of the floating piston chamber with the aid of second pump 36b.

During a transition of the braking system into its fallback level, first circuit separating valve 24a and second circuit separating valve 24b are opened automatically. Correspondingly, first reservoir separating valve 28a and second reservoir separating valve 28b are automatically controlled into their closed state. The driver is thus able to directly apply a pressure to all wheel brake cylinders 16a and 16b via the opened circuit separating valves 24a and 24b, without a brake fluid volume which is pressed out of master brake cylinder 10 into storage chambers 30a and 30b being lost. A response pressure of first storage chamber 30a additionally triggers an opening of check valve 50a. In this way, the brake fluid volume which was displaced out of the ring volume via first supply line 14a may be displaced via the check valve and first circuit separating valve 24a to the at least one wheel brake cylinder 16a of first brake circuit 12a. In this way, a fast fill effect may be triggered. (The use of the fast fill effect also allows the number of lines between master brake cylinder 10 and hydraulic power unit 32 to be reduced, and an advantageous fallback level to be implemented.) The fast fill effect may also be used to compensate for changes of the free travel caused by basic braking effects, such as knock back, air in the braking system, or the like.

FIGS. 2a through 2e show schematic representations for explaining an operating mode of a second specific embodiment of the braking system for a vehicle.

In contrast to the above-described specific embodiment, the braking system of FIGS. 2a through 2e includes no first reservoir separating valve 28a in second line section 22a. Instead, a check valve 52a is inserted into second line section 22a. A check valve 52b (between second reservoir separating valve 28b and the end section or branching point 29b) is situated in fourth line section 22b. Check valve 52b is oriented in such a way that, with its aid, a brake fluid transfer into associated storage chamber 30b is suppressed. Optionally, one further check valve 54a and 54b respectively may be situated at the delivery sides of pumps 36a and 36b, so that a brake fluid transfer from the respective delivery side into the respective pump interior of pump 36a or 36b is also suppressed.

Moreover, opening section 49 of third supply line 48 is situated between first circuit separating valve 24a and end section 25a in braking system/hydraulic power unit 32 of FIGS. 2a through 2e. Third supply line 48 is additionally equipped with an electrically controllable valve 56.

Figure 2A:
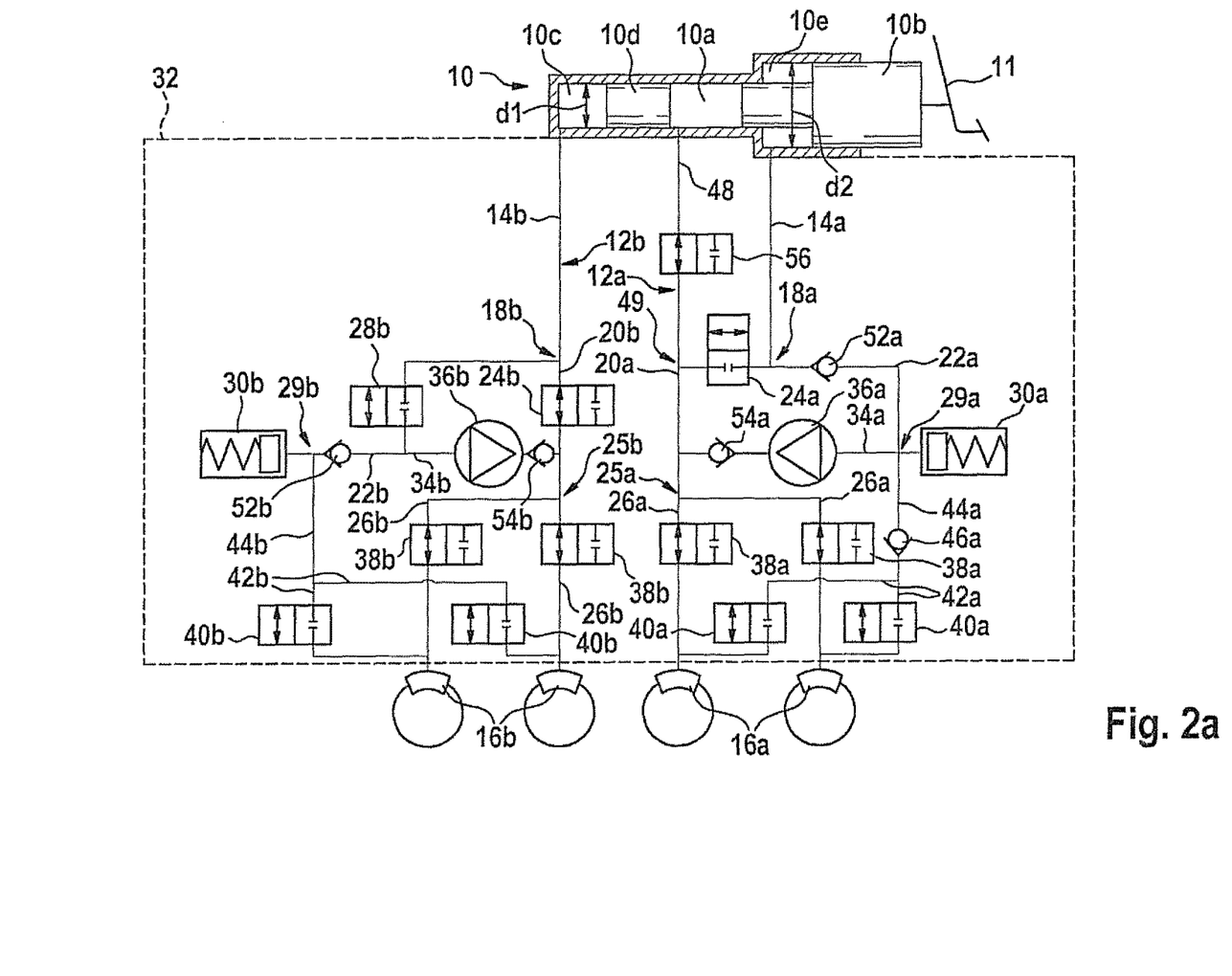
FIGS. 2a through 2e show schematic representations for explaining an operating mode of a second specific embodiment of the braking system for a vehicle.

FIG. 2a shows the braking system in an operating state in which none of its valves 24a, 24b, 28b, 38a, 38b, 40a, 40b and 56 are energized. While valves 24b, 38a, 38b and 56 are preferably open valves when de-energized, valves 24a, 28b, 40a and 40b are advantageously closed valves when de-energized.

Figure 2B:
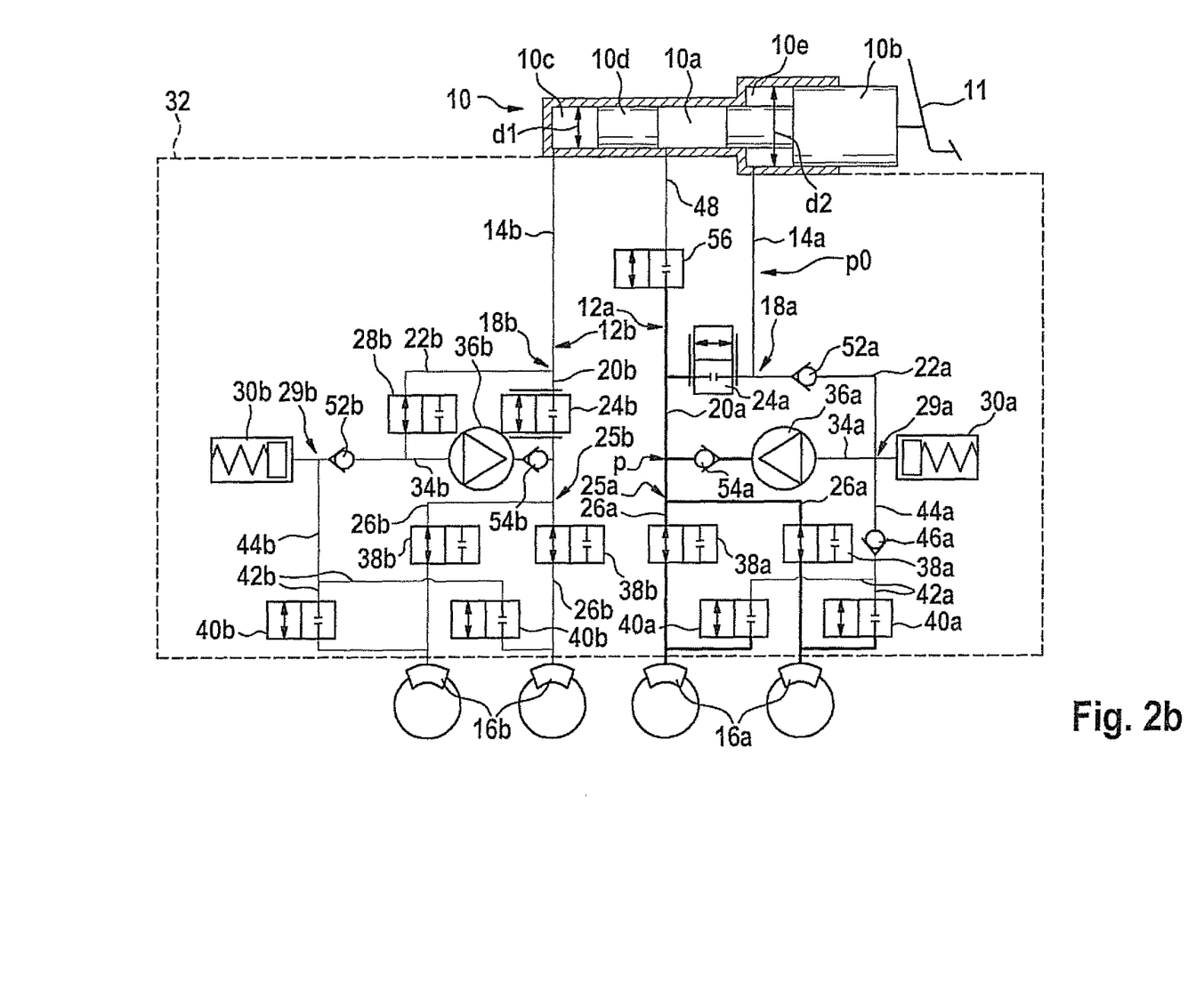

As is schematically represented in FIG. 2b, this specific embodiment is also well-suited for a brake boost with the aid of at least one of pumps 36a and 36b. During an application of pressure into master brake cylinder 10 by a driver, electrically controllable valve 56 preferably remains closed. The driver thus only applies pressure into floating piston chamber 10c and ring volume 10e. A system pressure p0 on a suction side of first pump 36a and in ring volume 10e may be set in such a way that the driver has a pleasant brake actuation sensation (pedal sensation). With the aid of the operation of first pump 36a, however, pressure p on a delivery side of first pump 36a and into wheel brake cylinders 16a of first brake circuit 12a may be set in such a way that a desired brake boost exists. Pressure p may be considerably higher than system pressure p0. Second pump 36b may also be used correspondingly. An additional volume needed for the brake boost may be suctioned from ring volume 10e or floating piston chamber 10c. In this specific embodiment, it is thus also unnecessary to equip the braking system with a brake booster, such as an electromechanical or a vacuum brake booster, or with a motorized piston-cylinder device.

Figure 2C:
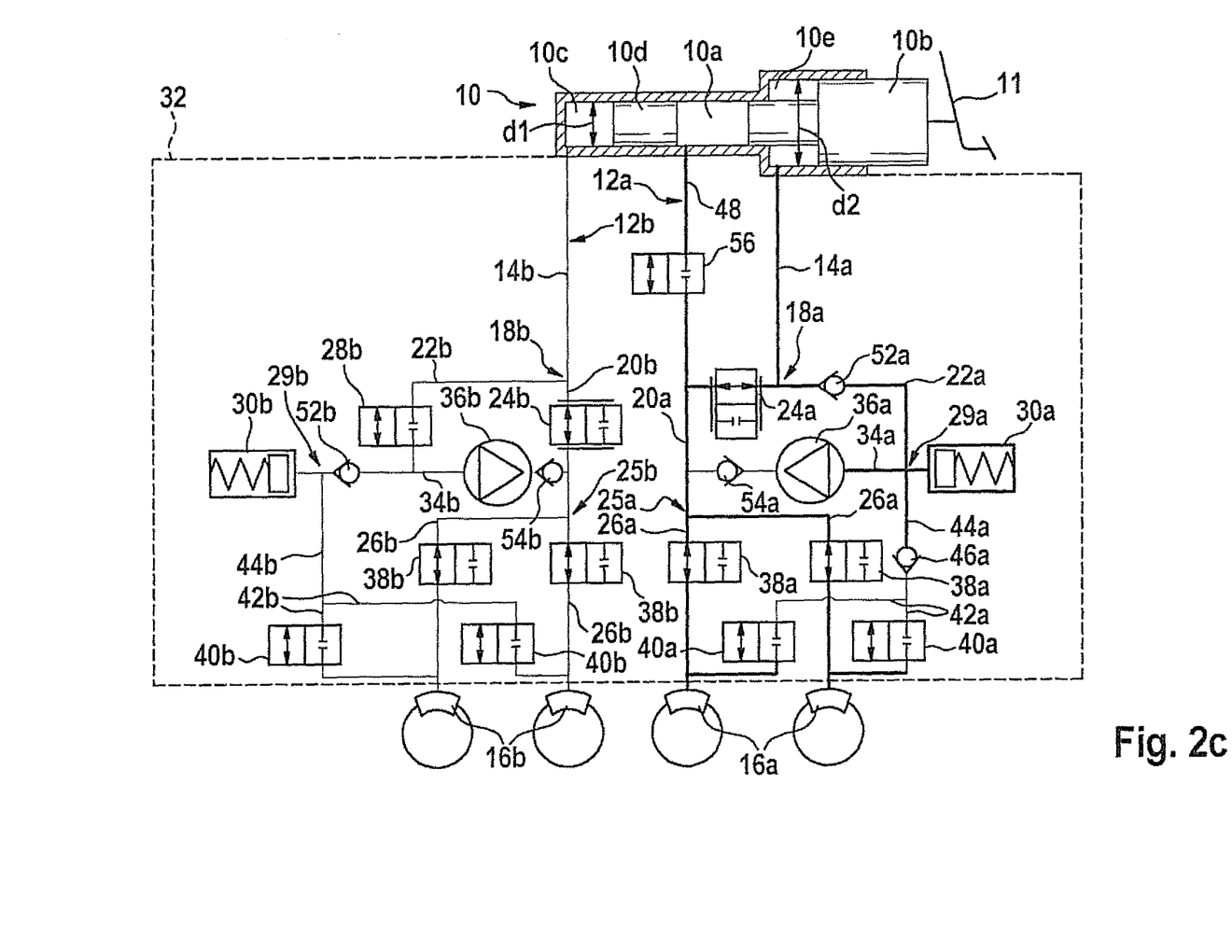
Figure 2D:
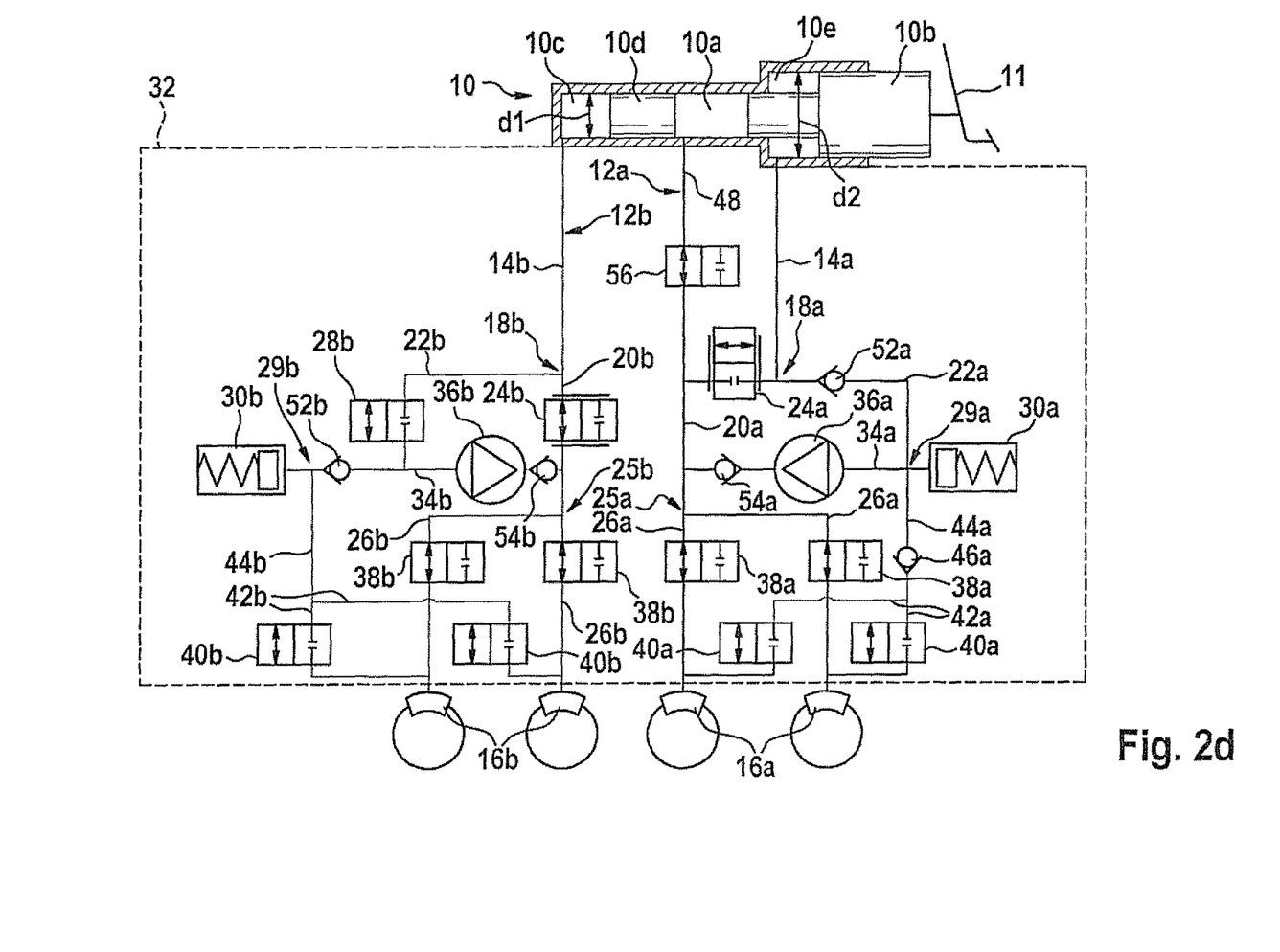

A brake pressure reduction, as shown in FIG. 2c, is easily possible by draining brake fluid via first circuit separating valve 24a into storage chamber 30a or into ring volume 10e.

In the braking system according to FIGS. 2a through 2e, an autonomous brake pressure buildup (e.g., for carrying out an autonomous braking action) is also possible. The exact procedure to do so, however, is not addressed in greater detail here.

In the event of a failure of the electrical system on the vehicle equipped with the braking system, the braking system is automatically transferred into the mechanical fallback level due to the advantageous design of its valves 24a, 24b, 28b, 38a, 38b, 40a, 40b and 56. With the transition into the mechanical fallback level, a response pressure of first storage chamber 30a automatically effectuates a closing of the air gaps in wheel brake cylinders 16a and 16b of first brake circuit 12a (see FIG. 2d). A corresponding effect is also achieved for second brake circuit 12b with second storage chamber 30b.

Figure 2E:
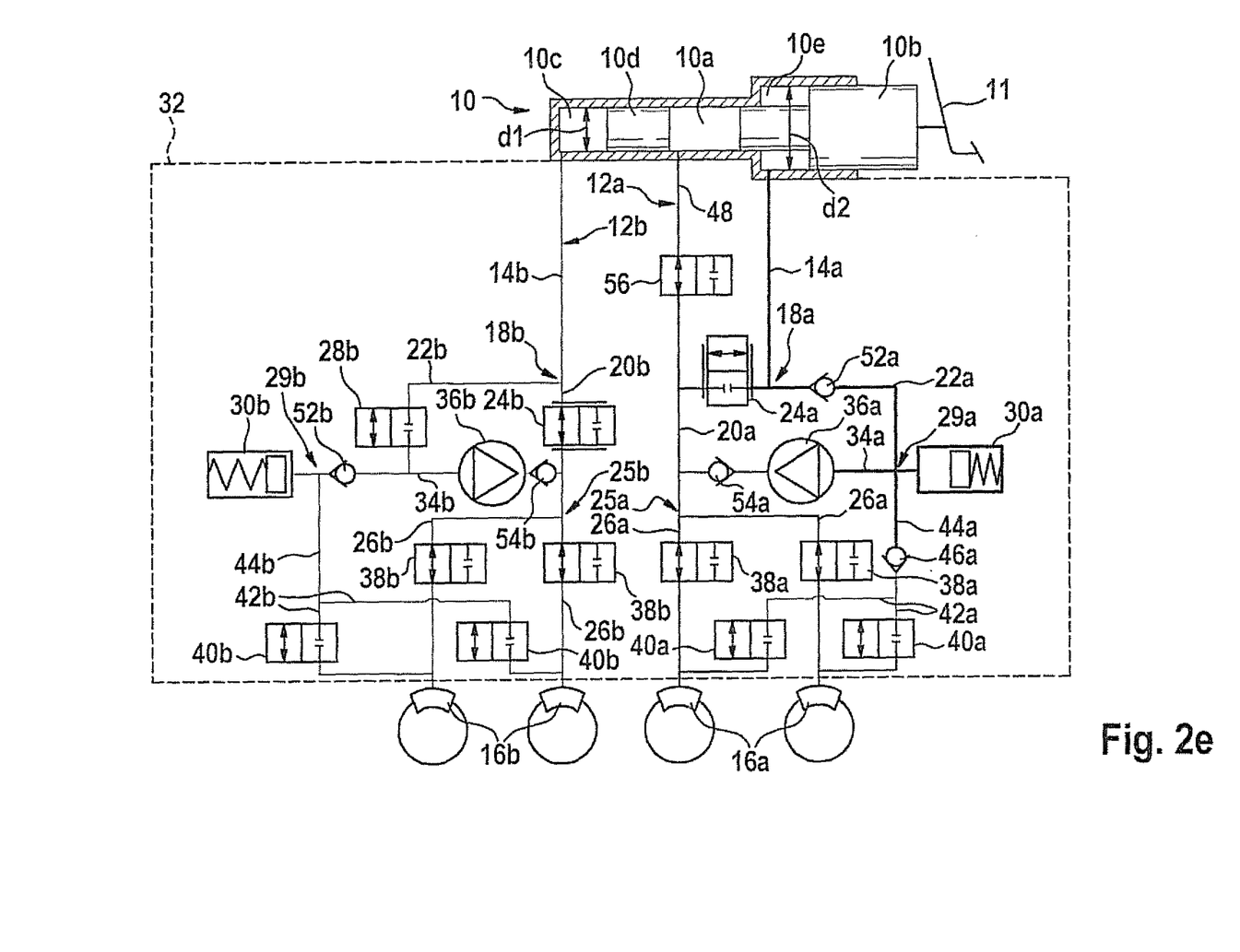

At the same time, the response pressure of first storage chamber 30a creates a fast fill effect shown with the aid of FIG. 2e. In this way, the driver is also able to achieve a pressure p over 2 bar with the aid of a comparatively low application force.

It is pointed out that the braking systems schematically shown in FIG. 1 and FIGS. 2a through 2e may be used in a plurality of different vehicle types/motor vehicle types, such as an electric or hybrid vehicle. A usability of such a braking system is neither limited to a certain vehicle type/motor vehicle type, nor to an exact number of wheels to be decelerated on the vehicle with the aid of the braking system.

It is additionally pointed out that in all specific embodiments master brake cylinder 10 may be designed with a comparatively small first diameter d1. This improves a utilization of second brake circuit 12b and of floating piston chamber 10c as a driver force simulator. During the actuation of the brake actuating element, the driver additionally also has the sensation of a "short pedal."

What is claimed is:

1. A hydraulic power unit for a braking system of a vehicle, comprising:
a first sub-brake circuit or brake circuit including a first supply line one of connected to a hydraulic power unit-internal master brake cylinder or connectable to a hydraulic power unit-external master brake cylinder, and at least one first connecting section to which a first wheel brake cylinder is one of connectable or connected; and
a second sub-brake circuit or brake circuit including a second supply line one of connected or connectable to the respective master brake cylinder, and at least one second connecting section to which at least one second wheel brake cylinder is connectable or connected;
wherein:
the first supply line branches at a supply line end into a first line section having a first circuit separating valve situated therein and a second line section having at least one of: i) a first electrically controllable reservoir separating valve, and ii) a first check valve situated therein, the at least one first connecting section being directly or indirectly connected to the first line section, and a first storage chamber being connected to the second line section, wherein the first circuit separating valve is situated in the first line section in a location in which, when brake fluid is flowing from the respective master brake cylinder into first storage chamber via the second line section, brake fluid is blocked from flowing to the at least one second wheel brake cylinder, by the first circuit separating valve when the first circuit separating valve is in a closed state;
the second supply line branches into a third line section having a second circuit separating valve situated therein and a fourth line section having at least one of: i) a second electrically controllable reservoir separating valve, and ii) a second check valve situated therein, the at least one second connecting section being directly or indirectly connected to the third line section, and a second storage chamber being connected to the fourth line section;
the first sub-brake circuit or brake circuit includes a third supply line, which is connected or connectable to the respective master brake cylinder; and
the third supply line is connected to the first supply line via a fluid line connection, the fluid line connection starting between the respective master cylinder and the first circuit separating valve and ending between the respective master cylinder and the at least one of the first electrically controllable reservoir separating valve and the first check valve, the fluid line connection being controlled by a valve directly downstream of the respective master cylinder.

2. The hydraulic power unit as recited in claim 1, wherein at least one of: i) the first sub-brake circuit or brake circuit includes a first connecting line section having a first pump situated therein, at a first end of the first connecting line section between the first circuit separating valve and the at least one first connecting section is connected to the first line section, and at a second end of the first connecting line section between the first reservoir separating valve or first check valve and the first storage chamber is connected to the second line section, and ii) the second sub-brake circuit or brake circuit includes a second connecting line section having a second pump situated therein, at a first end of the second connecting line section between the second circuit separating valve and the at least one second connecting section is connected to the third line section, and at a second end of the second connecting line section between the second reservoir separating valve or second check valve and the second storage chamber is connected to the fourth line section.

3. The hydraulic power unit as recited in claim 2, wherein at least one of: i) the first pump is an internal gear pump, and ii) the second pump is an internal gear pump.

4. The hydraulic power unit as recited in claim 1, wherein the third supply line opens into the first line section.

5. A braking system for a vehicle, comprising:
a master brake cylinder;
a first brake circuit including a first supply line connected to the master brake cylinder, and at least one first wheel brake cylinder; and
a second brake circuit including a second supply line connected to the master brake cylinder, and at least one second wheel brake cylinder;
wherein:
the first supply line branches at a first supply line end into a first line section having a first circuit separating valve situated therein and a second line section having at least one of: i) a first electrically controllable reservoir separating valve, and ii) a first check valve, situated therein, the at least one first wheel brake cylinder being directly or indirectly connected to the first line section, and a first storage chamber being connected to the second line section, wherein the first circuit separating valve is situated in the first line section in a location in which, when brake fluid is flowing from the master brake cylinder into first storage chamber via the second line section, brake fluid is blocked from flowing to the at least one second wheel brake cylinder, by the first circuit separate valve, when the first circuit separating valve is in a closed state; and
the second supply line branches into a third line section having a second circuit separating valve situated therein and a fourth line section having at least one of: i) a second electrically controllable reservoir separating valve, and ii) a second check valve situated therein, the at least one second wheel brake cylinder being directly or indirectly connected to the third line section, and a second storage chamber being connected to the fourth line section;
the first brake circuit includes a third supply line connected to the master brake cylinder; and
the third supply line is connected to the first supply line via a fluid line connection, the fluid line connection starting between the master cylinder and the first circuit separating valve and ending between the master cylinder and the at least one of the first electrically controllable reservoir separating valve and the first check valve, the fluid line connection being controlled by a valve directly downstream of the master cylinder.

6. The braking system as recited in claim 5, wherein at least one of: i) the first brake circuit includes a first connecting line section having a first pump situated therein, which at a first end of the first connecting line section between the first circuit separating valve and the at least one first wheel brake cylinder is connected to the first line section, and at a second end of the first connecting line section between the first reservoir separating valve or first check valve and the first storage chamber is connected to the second line section, and ii) the second brake circuit includes at least one second connecting line section having a second pump situated therein, which at a first end of the second connecting line section between the second circuit separating valve and the at least one second wheel brake cylinder is connected to the third line section, and at a second end of the second connecting line section between the second reservoir separating valve or second check valve and the second storage chamber is connected to the fourth line section.

7. The braking system as recited in claim 6, wherein at least one of: i) the first pump is an internal gear pump, and ii) the second pump is an internal gear pump.

8. The braking system as recited in claim 5, wherein the third supply line opens into the first line section.

9. The braking system as recited in claim 5, wherein the first supply line is connected to a ring volume of the master brake cylinder, the second supply line is connected to a floating piston chamber of the master brake cylinder, and the third supply line is connected to a rod piston chamber of the master brake cylinder.

* * * * *